United States Patent [19]

Faryar et al.

[11] Patent Number: 5,787,223
[45] Date of Patent: Jul. 28, 1998

[54] STORAGE OF DIGITAL DATA AS ANALOG SIGNALS

[75] Inventors: Alireza Farid Faryar, Fair Haven; Kim Nigel Matthews, Watchung; George John Kustka, Marlboro, all of N.J.

[73] Assignee: Lucent Technologies Inc., Murray Hill, N.J.

[21] Appl. No.: 719,290

[22] Filed: Sep. 17, 1996

[51] Int. Cl.$^6$ .............................. H04N 5/91; H04N 5/911
[52] U.S. Cl. .............................................. 386/46; 386/116
[58] Field of Search .......................... 386/34, 111, 112, 386/109, 73, 27, 116, 46, 40, 124; 360/32; H04N 5/91, 5/911

[56] References Cited

U.S. PATENT DOCUMENTS

| | | | |
|---|---|---|---|
| 4,646,165 | 2/1987 | Hirota | 386/34 |
| 4,901,159 | 2/1990 | Hitotsumachi . | |
| 5,164,839 | 11/1992 | Lang | 386/96 |
| 5,166,780 | 11/1992 | Shyu . | |
| 5,189,564 | 2/1993 | Amada et al. . | |
| 5,206,738 | 4/1993 | Nishigaki et al. . | |
| 5,260,972 | 11/1993 | Wang . | |
| 5,299,022 | 3/1994 | Nagumo et al. | 386/34 |
| 5,337,193 | 8/1994 | Murabayashi et al. . | |
| 5,504,759 | 4/1996 | Inoue et al. | 386/116 |
| 5,621,535 | 4/1997 | Heyl | 386/34 |

OTHER PUBLICATIONS

"History of Home Videotape Recorder Development", by Yuma Shiraishi, SMPTE Journal, Dec. 1985; pp. 1257–1263.

"A Digital 1.2 Gbit/sec vCR for Universial Recording Format of HD Image Data", by W. Schiffler, J. Heitmann, and H. Vaanholt, SMPTE Journal, Jul. 1994, pp. 439–443.

"Composite Analog Video Signal—NTSC for Studio Applications", by SMPTE Standard, ANSI/SMPTE 170M–1994, pp. 1–19.

"½–in Type H—Cassette, Tape and Records", by SMPTE Standard, ANSI/SMPTE 32M–1993, pp. 1–44.

"Image and Video Coding Standards", by Rangarajan Aravind et al., AT&T Techanical Journal, Jan./Feb. 1993, pp. 67–89.

*Primary Examiner*—Robert Chevalier

[57] ABSTRACT

Digital streams are converted into analog signals for recording by analog recorders, such as conventional video cassette recorders, onto analog storage media, such as conventional video cassette tapes. The recorded analog signals are then retrieved from the analog storage media using an analog player, such as a conventional video cassette player, and converted back into the original digital streams. The present invention allows conventional analog-based recording and playing equipment, like video cassette recorders/players, to be used for storing and retrieving digital data. In one embodiment, the digital streams correspond to digital audio/video data and the retrieved digital streams can be further processed to playback the audio/video streams using conventional television sets. In other embodiments, the digital streams correspond to other digital data streams that can be converted into analog signals for storage and retrieval using conventional video cassette recorders and conventional video cassette tapes.

44 Claims, 6 Drawing Sheets

STORAGE OF DIGITAL DATA AS ANALOG SIGNALS

BACKGROUND OF THE INVENTION

1. Field of the Invention

The present invention relates to data processing, and, in particular, to the storage of digital data, such as audio/video data, as analog signals on storage media, such as magnetic tape.

2. Description of the Related Art

Digital representations of audio and video signals provide certain advantages over analog representations of those same signals. Digital streams are typically less susceptible to the adverse affects of noise than are analog signals. Furthermore, processing can be applied to a digital stream to add error correction codes (e.g., checksum and parity check values) to the digital stream to provide a playback system with the ability to detect—and possibly make appropriate corrections—when errors (e.g., bit flips) do occur during processing (e.g., generation, storage, transmission, or retrieval) of the digital data. As a result, the quality of the playback of audio and video signals is typically higher for digital streams than for the corresponding analog signals.

Traditionally, consumer products for playing audio and/or video have been analog-based systems. Many of these systems are based on the storage of analog audio and/or video signals onto magnetic tape. These systems include audio cassette tape recorders for audio signals and video cassette recorders/players (VCRs) for audio/video signals. For example, millions of consumers throughout the world own VCRs that are able to record analog audio/video signals onto video cassette tapes and then play back those recorded signals for rendering by conventional television sets.

It would be advantageous to provide the capability of enjoying the higher quality of digital audio and video streams to current owners of conventional analog-based VCRs without requiring those owners to purchase a lot of expensive new digital audio/video processing equipment.

The present invention is directed to technology that enables the storage and/or retrieval of digital streams, such as digital audio and video streams, using conventional analog-based VCRs.

Further objects and advantages of this invention will become apparent from the detailed description which follows.

SUMMARY OF THE INVENTION

The present invention is directed to converting a digital input stream into an analog output signal. According to one embodiment, a timing generator generates timing signals. A modulator modulates the digital input stream to generate a modulated digital stream, a composite stream generator generates a composite digital stream from the timing signals and the modulated digital stream, and a digital-to-analog (D/A) converter converts the composite digital stream into the analog output signal, where the analog output signal has the temporal and spectral characteristics of a television signal.

The present invention is also directed to converting an analog input signal into a digital output stream. According to one embodiment, an analog-to-digital (A/D) converter converts the analog input signal into a digital stream, wherein the analog input signal corresponds to a modulated digital stream and has the temporal and spectral characteristics of a television signal. A demodulator demodulates the modulated digital stream to generate a demodulated digital stream and a timing generator generates timing signals based on the analog input signal.

The present invention is also directed to modulating and demodulating digital streams. According to one embodiment, a timing generator generates timing signals and a stream modulator generates an analog output signal from the timing signals and the digital input stream, wherein the analog output signal has the temporal and spectral characteristics of a television signal and the analog output signal is capable of being input to an analog recorder for recording the analog output signal onto a storage medium. A stream demodulator receives an analog input signal from an analog player and converts the analog input signal into a digital output stream. The stream demodulator may be used to recover the original bitstream that was modulated by the stream modulator.

The present invention is also directed to apparatuses for modulating a digital input stream. According to one embodiment, the apparatus comprises a timing generator and two or more modulation stages, wherein each modulation stage comprises a delay processor and a stream modulator. The timing generator generates timing signals. For each modulation stage, the delay processor generates delay signals based on the timing signals and the stream modulator converts one or more portions of the digital input stream into one or more portions of an analog output signal based on the delay signals, wherein the analog output signal has the temporal and spectral characteristics of a television signal and is capable of being recorded onto a storage medium. The apparatus may be used for high-speed modulation and recording processing.

The present invention is also directed to methods for modulating a digital input stream. According to one embodiment, timing signals are generated. The digital input stream is divided into two or more portions, and, for each portion of the digital input stream, (1) delay signals are generated based on the timing signals, and (2) the portion of the digital input stream is converted into a portion of an analog output signal based on the delay signals, wherein the analog output signal has the temporal and spectral characteristics of a television signal and is capable of being recorded onto a storage medium. The method may be used for high-speed modulation and recording processing.

BRIEF DESCRIPTION OF THE DRAWINGS

Other objects, features, and advantages of the present invention will become more fully apparent from the following detailed description, the appended claims, and the accompanying drawings in which:

DETAILED DESCRIPTION

The present invention is directed to technology that allows digital streams to be converted to analog signals for storage by analog recorders, such as conventional video cassette recorders/players (VCRs), onto analog storage media, such as conventional video cassette tapes. The present invention is also directed to technology that allows those recorded analog signals to be converted back into their original digital streams for further processing. The digital streams may correspond to any digital data, including audio, video, and/or data streams.

Processing Generic Digital Data Streams

According to the present invention, any digital data stream can be digitally modulated and digital-to-analog (D/A) converted for recording onto conventional video cassette tapes. The recorded analog signal can then be retrieved from the video cassette tape, digitized, and demodulated to recover the original digital data stream. In this way, conventional analog-based video cassette recorders and players can be used to store and retrieve any digital data using conventional analog-based video cassette tapes.

Figure 1:
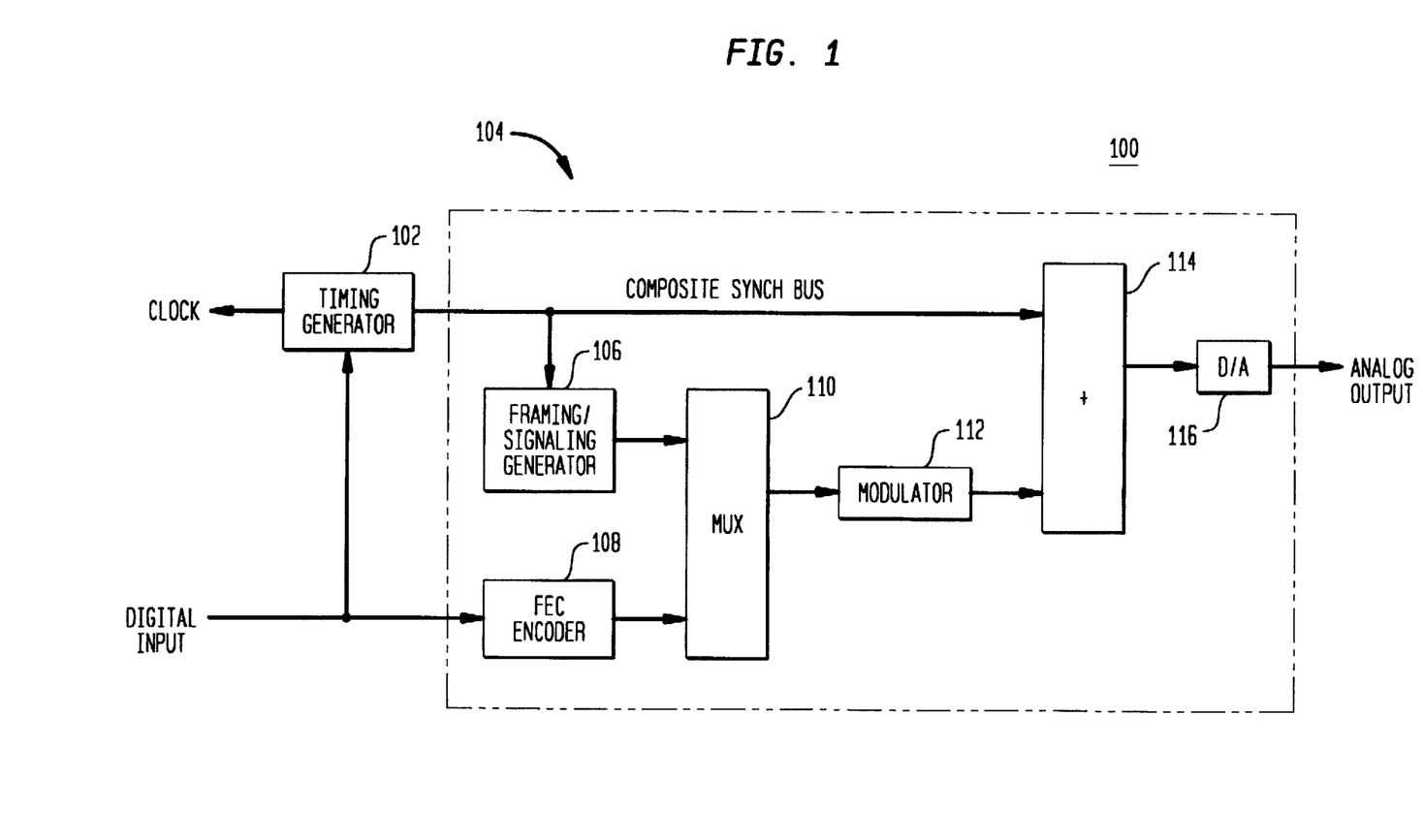
FIG. 1 is a block diagram of a modulation system, according to one embodiment of the present invention.

Referring now to FIG. 1, there is shown a block diagram of modulation system 100, according to one embodiment of the present invention. Modulation system 100 converts a digital input stream into an analog output signal that is capable of being recorded by a conventional video cassette recorder (not shown) onto a conventional video cassette tape (not shown).

In particular, modulation system 100 of FIG. 1 comprises timing generator 102 and stream modulator 104. Stream modulator 104 comprises framing/signaling generator 106, forward error correction (FEC) encoder 108, multiplexer (mux) 110, modulator 112, composite stream generator 114, and D/A converter 116.

Timing generator 102 can generate a clock for the digital input stream. Timing generator 102 also generates the clock and timing signals used to process the digital input stream for conversion and recording onto magnetic tape. In addition, timing generator 102 generates vertical and horizontal synchronization pulses. The synchronization pulses are digital signals that correspond to the standard synchronization pulses in analog signals recorded by video cassette recorders. These standard synchronization pulses are described in the Society of Motion Picture and Television Engineering, Standard for Television, 170M-1994, "Composite Analog Video Signal—NTSC for Studio Applications" which is incorporated herein by reference.

Framing/signaling generator 106 generates a code signal at the beginning of each field of data in the digital input stream. A field of data in the digital input stream is a block of bits recorded on the area of magnetic tape where a field of analog video signals is usually recorded. The code signals are provided to assist a demodulator in timing and phase recovery. Such a demodulator is described later in this specification in conjunction with FIG. 2. For further description of the use of such code signals, see U.S. Pat. No. 5,260,972 (Jin-Der Wang), "Technique for Determining Signal Dispersion Characteristics in Communications Systems, issued Nov. 09, 1993, which is incorporated herein by reference.

Figure 8:
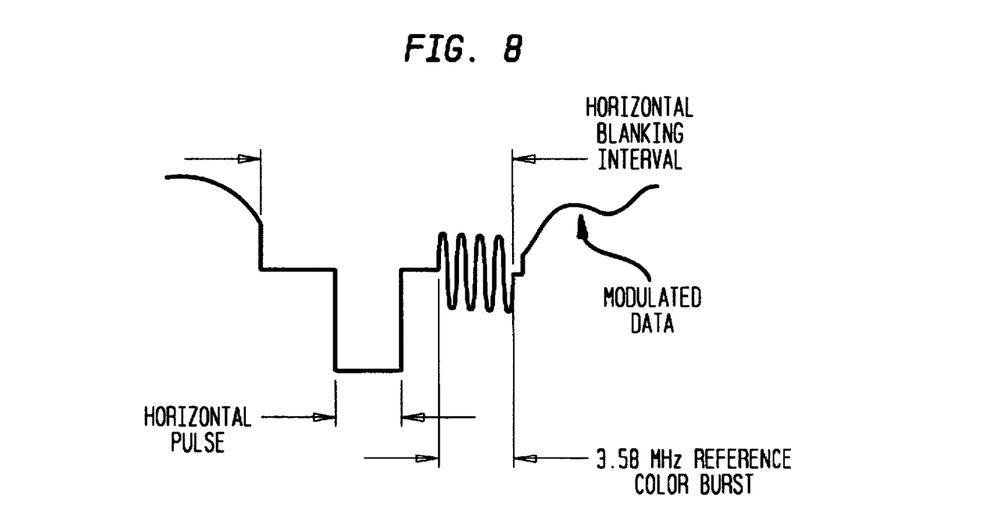
FIG. 8 is a representation (not to scale) of the location of a 3.58 MHz reference color burst on a horizontal blanking signal.

For color transmission, compatible with black and white television, color information is transmitted on a 3.58 (actually 3.579545) MHz sub-carrier. Color information is transmitted in the form of amplitude and phase deviation with respect to the color burst, approximately 9 cycles of the 3.58 MHz sub-carrier oscillator as shown in FIG. 8.

In modulation system 100, the color sub-carrier signal is used as a pilot tone for synchronizing the modulator and demodulator clocks. In a demodulation system, such as the demodulation system described later in this specification in conjunction with FIG. 2, the color burst is found by first detecting each horizontal phase. The color burst is then filtered and passed to a phase-locked loop (PLL) circuit that generates the system clock. All other clocks used in the system are slaved to the system clock.

FEC encoder 108 applies processing to the digital input stream to add error correction codes to the digital input stream to generate a modified digital stream. These error correction codes are provided to assist a demodulator in detecting and possibly correcting any recording/playback errors (e.g., bit flips).

Examples of possible error correction codes include, but are not limited to, Hamming codes, cyclic codes, convolutional codes, and Reed-Solomon codes. For further description of FEC coding, see Stephen B. Wicker, "Error Control Systems for Digital Communication and Storage," Prentice Hall, 1995, which is incorporated herein by reference. FEC encoder 108 and its error correction processing are optional.

Mux 110 combines the code signals from framing/signaling generator 106 and the modified digital stream from FEC encoder 108 to generate a digital input stream to modulator 112.

Modulator 112 applies an appropriate signaling technique to digitally modulate its received digital input stream to generate a modulated digital stream. In one embodiment, the digital input stream is separated into fields to which overhead information is added for signal recovery, protection, etc. Every field of data is digitally modulated such that, when converted to an analog signal for recording onto a video cassette tape, each field of data occupies the same frequency band occupied by a conventional analog video signal on a video cassette tape. Possible signaling techniques include, but are not limited to, quadrature amplitude modulation (QAM) of appropriate dimension (e.g., 4QAM, 16QAM) and pulse amplitude modulation (PAM). Other techniques could be used to increase the capacity of the tape, including Trellis-coded modulation plus Viterbi decoding, higher constellations (e.g., 64QAM, 256QAM), and discrete multi-tone (DMT). For further description, see M. A. Tzannes et al., "DMT Systems, DWMT Systems, and Digital Filter Banks," ICC 94, New Orleans, La, pp.311-315, May 1994, which is incorporated herein by reference.

Composite stream generator 114 combines the synchronization signals from timing generator 102 with the modulated digital stream from modulator 112 to generate a composite digital stream. D/A converter 116 converts this composite digital stream into an analog output signal that is capable of being recorded onto a conventional video cassette tape by a conventional video cassette recorder. That is, the analog output signal has the temporal and spectral characteristics of a conventional television signal. Alternatively, the analog output signal may be transmitted over a suitable communications path to a remote receiver for storage and/or recovery/playback.

Modulation system 100 is able to convert different types of digital input streams into analog output signals. In general, a digital input stream may comprise audio, video, or data, or any combination of these. As such, modulation system 100 provides a mechanism for turning a conventional video cassette recorder into a storage device for any digital data. For example, in addition to being able to record digital audio/video streams, modulation system 100 could be used with a conventional video cassette recorder to back up data files on a personal computer (PC) by converting digital streams corresponding to the files to analog output signals to be recorded onto one or more video cassette tapes.

Figure 2:
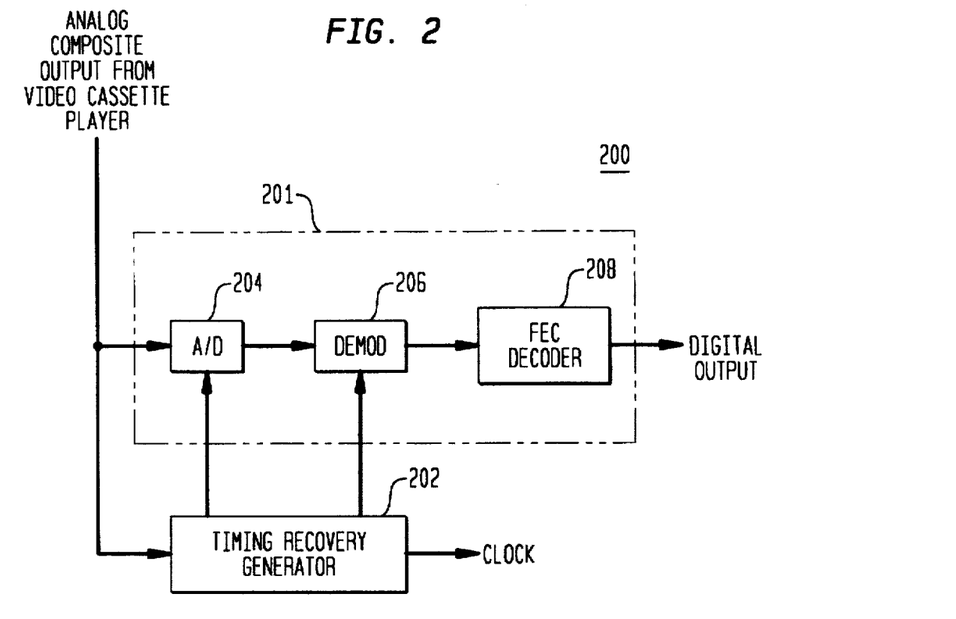
FIG. 2 is a block diagram of a demodulation system, according to one embodiment of the present invention.

Referring now to FIG. 2, there is shown a block diagram of demodulation system 200, according to one embodiment of the present invention. Demodulation system 200 reverses the processing of modulation system 100 of FIG. 1. That is, demodulation system 200 converts an analog signal generated by modulation system 100 back into the original digital stream that was input into modulation system 100. As such, demodulation system 200 can be used in conjunction with a conventional video cassette player to recover the digital data that was stored as an analog signal onto a video cassette tape using the combination of modulation system 100 and a conventional video cassette recorder. Demodulation system 200 is self synchronizing and demodulates the analog input signal into a copy of the original digital stream.

In particular, demodulation system 200 comprises stream demodulator 201 and timing recovery generator 202. Stream demodulator 201 comprises analog-to-digital (A/D) converter 204, demodulator 206, and forward error correction (FEC) decoder 208. Demodulation system 200 receives as an input the analog composite output from a video cassette player (not shown).

Timing recovery generator 202 generates a system clock based on the analog signal received from the video cassette player. All other internal clocks are slaved to this system clock. Depending on the embodiment, generator 202 may use different techniques for generating the system clock. For example, generator 202 could use the color bursts, shown in FIG. 8, in conjunction with a phase locked loop circuitry to generate the system clock. Alternatively, the system clock could be based on the framing/signaling signals that were recorded at the beginning of each horizontal line in the analog input signal. These signals could also be used for equalization. Furthermore, generator 202 could apply decision-directed recovery schemes based on the data itself to generate the system clock. In general, these different techniques may be used individually or in any combination to generate the system clock. For further description, see John G. Proackis, "Digital Communications," McGraw Hill, Inc. 1995, which is incorporated herein by reference.

In any case, A/D converter 204 uses the system clock to convert portions of the analog signal into a digital stream. This digital stream is equivalent to the modulated stream generated by modulator 112 of FIG. 1 (except for any channel contamination). Using the timing recovery signals from generator 202, demodulator 206 applies appropriate demodulation processing to undo the modulation performed by modulator 112 of FIG. 1. The resulting demodulated stream is input to FEC decoder 208, which uses error correction codes that may be in the demodulated stream to perform error correction processing to detect and if possible correct any errors that were introduced into the digital data during the generation/recovery processing. During normal operations, the output of FEC decoder 208 will be an error-corrected digital stream that is identical to the digital input stream originally received by modulation system 100 of FIG. 1. Like FEC encoder 108 of FIG. 1, FEC decoder 208 and its error correction processing are optional.

Figure 3:
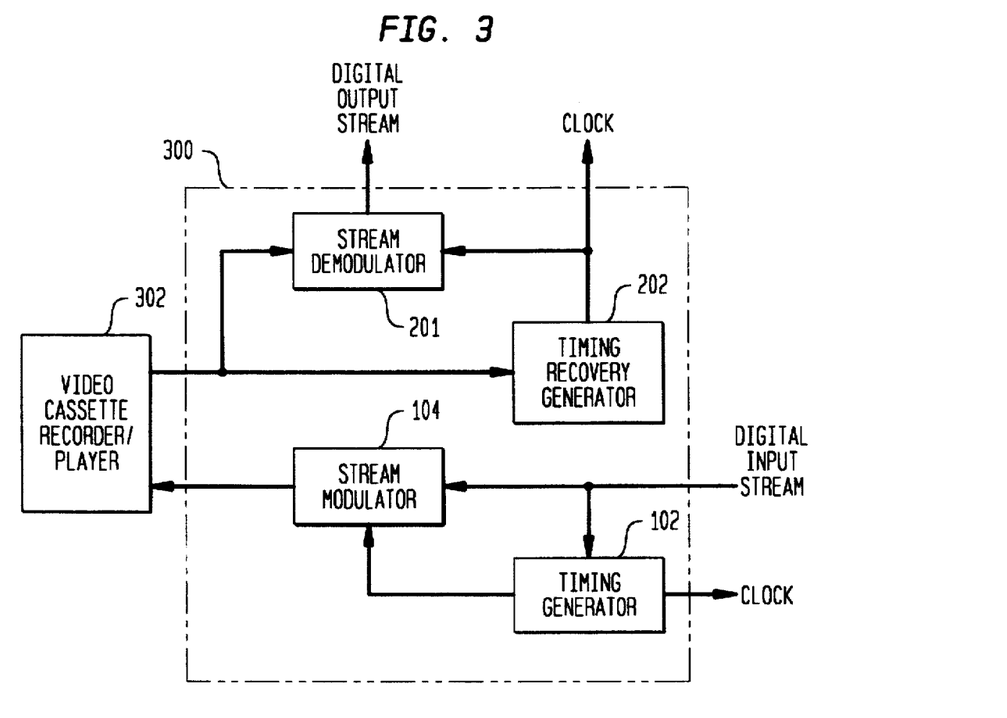
FIG. 3 is a block diagram of a modulator/demodulator (modem), according to one embodiment of the present invention.

Referring now to FIG. 3, there is shown a block diagram of modulator/demodulator (modem) 300, according to one embodiment of the present invention. Modem 300 is used in conjunction with conventional video cassette recorder/ player 302 to record digital data streams onto conventional video cassette tapes and to retrieve those or other digital data streams from the same or other video cassette tapes.

In particular, modem 300 comprises timing generator 102 and stream modulator 104 of FIG. 1 and stream demodulator 201 and timing recovery generator 202 of FIG. 2. As described earlier in this specification in conjunction with FIG. 1, stream modulator 104 receives a digital input stream and converts that digital input stream into an analog output signal capable of being of recorded by conventional video cassette recorder/player 302 onto a conventional video cassette tape. As described earlier in this specification in conjunction with FIG. 2, stream demodulator 201 receives an analog input signal retrieved from a video cassette tape by video cassette recorder/player 302 and converts the analog input signal into a digital output stream. When used together with the same video cassette tape, the recovered digital output stream generated by stream demodulator 201 will normally be identical to the original digital input stream received by stream modulator 104 at recording time.

In this way, modem 300 converts a conventional analog-based video cassette recorder/player into a recording device for digital data, and a conventional video cassette tape into a storage medium for that digital data.

Processing Digital Audio/Video Streams

Digital streams comprising audio and/or video data are among the types of the digital data streams that can be recorded onto and retrieved from conventional video cassette tapes when using the present invention in conjunction with a conventional video cassette recorder/player.

Figure 4:
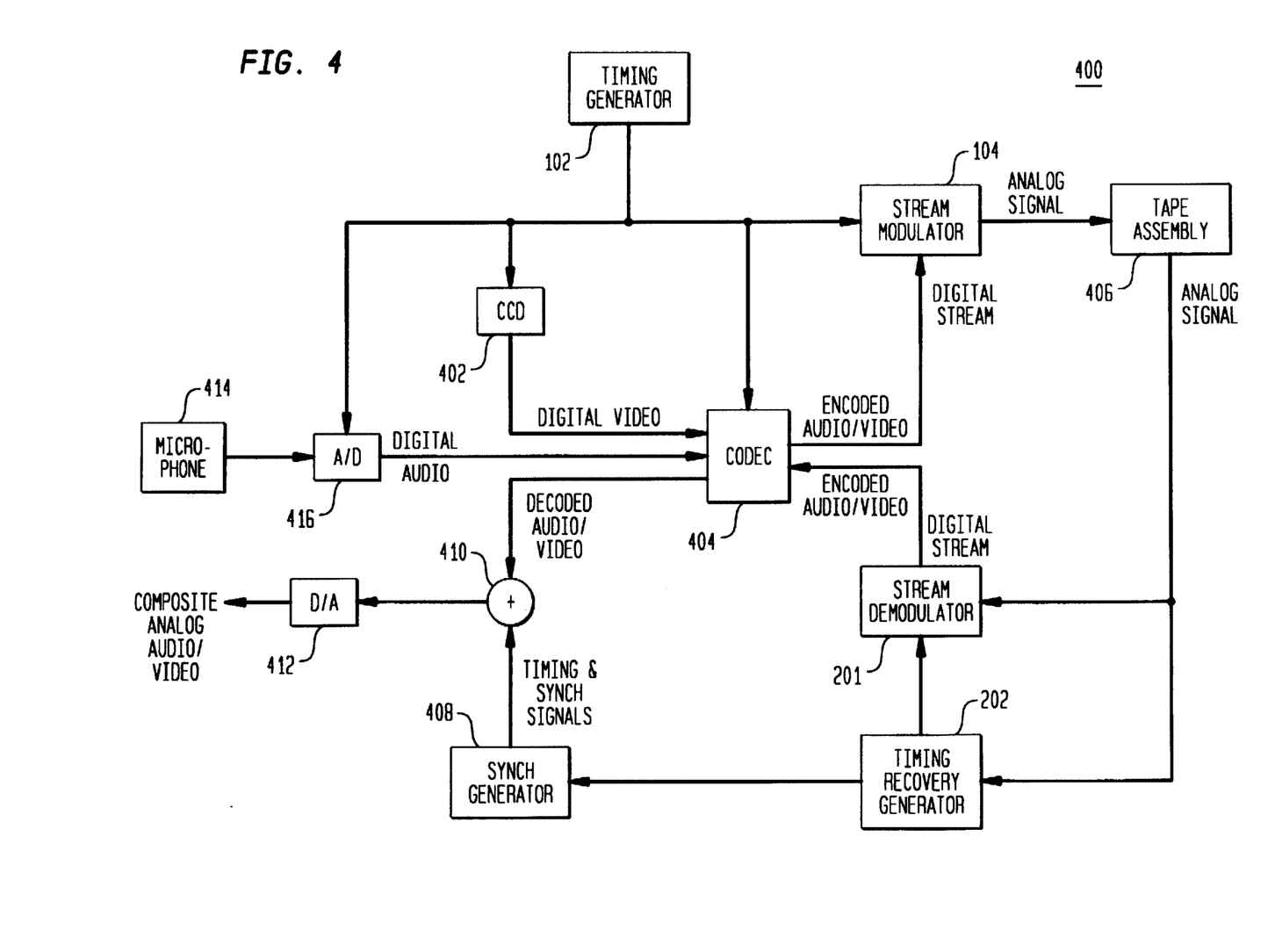
FIG. 4 is a block diagram of a digital camera/recorder (camcorder), according to one embodiment of the present invention.

Referring now to FIG. 4, there is shown a block diagram of digital camera/recorder (camcorder) 400, according to one embodiment of the present invention. Digital camcorder 400, which is based on modulation system 100 of FIG. 1 and demodulation system 200 of FIG. 2, generates encoded digital audio/video streams and then converts those digital streams into analog signals for recording onto conventional video cassette tapes. Camcorder 400 also has the capability of playing back those recorded analog signals.

In particular, digital camcorder 400 comprises timing generator 102 and stream modulator 104 of modulation system 100 of FIG. 1 and timing recovery generator 202 and stream demodulator 201 of FIG. 2, as well as charge coupled device (CCD) camera assembly 402, coder/decoders (codec) 404, tape assembly 406, synchronization generator 408, composite signal generator 410, D/A converter 412, microphone assembly 414, and A/D converter 416.

Based on clock signals received from timing generator 102, CCD camera assembly 402 generates digital video images and codec 404 applies an appropriate video encoding algorithm to compress those digital video images in to an encoded video bitstream of appropriate speed. Codec 404 may apply any appropriate video encoding scheme, such as those promulgated by the Motion Picture Experts Group (MPEG). For further description of MPEG video coding schemes, see B. G. Haskell et al., "Image and Video Coding Standards," AT&T Technical Journal, Jan/Feb 1993, pp.67–89, which is incorporated herein by reference.

Similarly, A/D converter 416 uses clock signals from timing generator 102 to convert analog audio signals received from microphone assembly 414 into a digital audio stream. Codec 404 applies an appropriate audio encoding scheme, such as adaptive differential pulse code modulation (ADPCM), to compress the digital audio stream into an encoded audio bitstream of appropriate speed.

Stream modulator 104 combines the encoded audio and video bitstreams and converts the resulting encoded audio/ video bitstream into an analog signal (as described earlier in this specification in conjunction with FIG. 1) for recording by tape assembly 406 onto a conventional video cassette tape.

Digital camcorder 400 is also able to play back the recorded audio/video bitstream. As described earlier in this specification in conjunction with FIG. 2, timing recovery generator 202 generates a system clock based on the analog signal received from tape assembly 406. Stream demodulator 201 uses the system clock to digitize and demodulate the analog signal to recover the digital stream comprising the encoded audio/video bitstream. Codec 404 decodes the encoded audio/video bitstream to generate a digital stream of decoded audio/video data. Meanwhile, synchronization generator 408 uses the system clock to generate timing signals and horizontal and vertical synch signals, which are combined with the decoded audio/video by composite stream generator 410 to generate a composite digital stream. D/A converter 412 D/A converts the composite digital stream to generate a composite analog video signal that can be input to a conventional television set for playing.

Depending on the implementation, the audio portion of an audio/video presentation may be handled in different ways. In FIG. 4, the audio portion is digitized, modulated, and D/A converted along with the video portion for recording onto the "video" tracks of a conventional video cassette tape as described earlier in the specification in conjunction with modulation system 100 of FIG. 1. In an alternative implementation, the audio portion may be recorded onto the audio track of a conventional video cassette tape in a conventional manner. It will also be understood that the design of digital camcorder 400 of FIG. 4 can be modified to process other types of data instead of or in addition to audio/video data.

Figure 5:
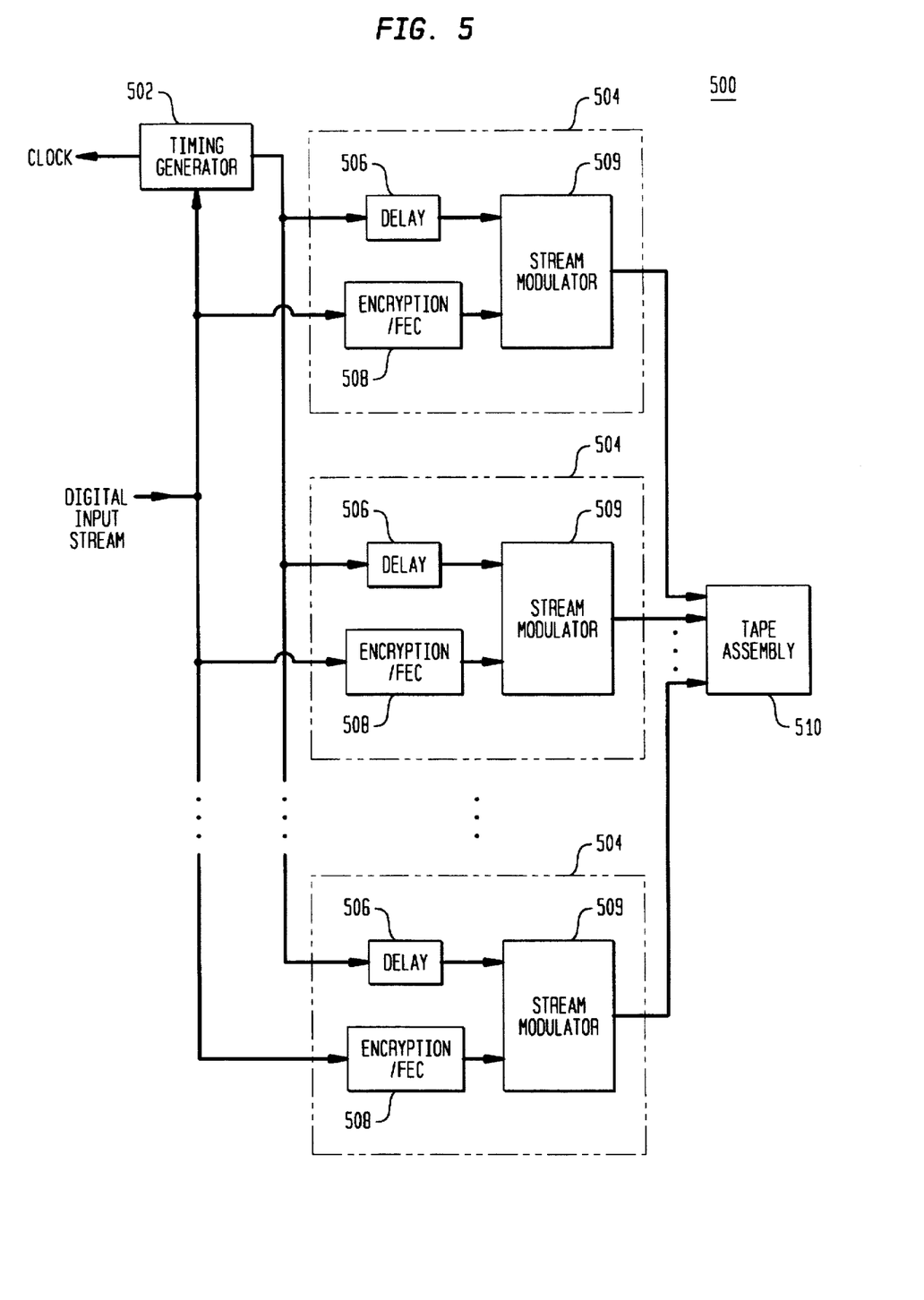
FIG. 5 is a block diagram of a high-speed digital modulator, according to one embodiment of the present invention.

Referring now to FIG. 5, there is shown a block diagram of high-speed digital modulator 500, according to one embodiment of the present invention. High-speed digital modulator 500 is based on modulation system 100 of FIG. 1 and, as such, is able to convert digital streams into analog signals for recording onto video cassette tapes. The digital input streams received by high-speed modulator 500 may comprise any digital data, including encoded audio/video bitstreams such as those generated by codec 404 of FIG. 4.

As described below, high-speed digital modulator 500 is able to convert digital input streams into analog signals and record those analog signals onto video cassette tapes at high speed. As a result, high-speed modulator 500 may be used for mass production of pre-recorded video cassette tapes.

In particular, high-speed digital modulator 500 comprises timing generator 502, one or more modulation stages 504, and tape assembly 510. Timing generator 502 generates the clock and timing signals used to process the digital input stream for conversion and recording onto magnetic tape. In one embodiment, modulation stages 504 operate in parallel to modulate different portions of the digital input stream for recording by tape assembly 510 onto different tracks of a single video cassette tape. In one embodiment, the output of modulation stages 504 drives tape assembly 510 which has as many write heads as there are modulation stages 504. In this embodiment, each modulation stage 504 processes a different portion of the digital input stream for recording at the appropriate time and location as an analog signal onto the video cassette tape. Each modulation stage 504 comprises delay processor 506, encryption/FEC processor 508, and stream modulator 509. For a description of multi-head video recording, see Shinichi Makino, "An Experimental Digital 1.2 Gbit/sec VCR for 1125/60 HDTV Signal," SMPTE Journal, July 1994, pp.444–446, which is incorporated herein by reference.

In order to record different portions of the digital input stream, delay processor 506 of each modulation stage 504 uses timing signals received from timing generator 502 to buffer appropriate portions of the digital input stream for conversion by stream modulator 509. The timing signals are also used by each delay processor 506 to determine the appropriate time for tape assembly 510 to write the output of each stream modulator 509 onto the video cassette tape.

As shown in FIG. 5, for each modulation stage 504, encryption/FEC processor 508 applies encryption processing and forward error correction (FEC) processing to the appropriate portions of the digital input stream to generate portions of an encrypted digital stream having error correction codes. Encryption may be used to protect the investment of the content and/or service provider. In an alternative embodiment of the present invention, encryption and FEC processing of the entire digital stream may be implemented by a single encryption/FEC processor that distributes portions of the resulting digital stream to the appropriate modulation stages 504. Processor 508 and its encryption and FEC processing are optional.

Stream modulator 509 is similar to stream modulator 104 of FIG. 1, except that stream modulator 509 runs p times faster than stream modulator 104, where p may be a number greater than 1. In that case, all signal spectrums and the transfer function of every section in high-speed modulator 500 are p times wider. Furthermore, center frequencies are transferred top times the original frequencies. For example, if the output of stream modulator 104 occupies the range of frequencies between 3 and 4 MHz, then the output of stream modulator 509 would occupy the 3p to 4p MHz range.

High-speed digital modulator 500 is able to convert and record the digital input stream onto magnetic tape at a high speed. That is, at a speed greater than the speed at which a conventional video cassette player will retrieve the recorded analog signal from the magnetic tape. For example, if the playback of the digital input stream takes 30 minutes using a conventional video cassette player, then the process of converting and recording that stream onto magnetic tape by high-speed modulator 500 would take less than 30 minutes.

The recording speed of high-speed modulator 500 depends on the linear speed of the tape and the number of parallel heads used in the writing process (i.e., the number of modulation stages 504). With m modulation stages 504 and a linear tape speed of p times the real-time playback speed, the recording speed will be (m×p) tines the playback speed. For example, with m=10 and p=5, a 100-minute audio/video program can be recorded in about 2 minutes.

In the embodiment of FIG. 5, high-speed digital modulator 500 records a digital input stream onto different tracks of a single video cassette tape. In alternative embodiments of the present invention, high-speed digital modulator 500 may be configured to record the digital input stream onto two or more video cassette tapes in parallel. In these embodiments, different groups of modulation stages 504 may record identical analog output signals onto different video cassette tapes at the same time. For example, in one embodiment, digital modulator 500 may have three groups, with four modulation stages 504 and one tape assembly 510 in each group, where digital modulator 500 writes to three different video cassette tapes in parallel and each of the three groups of four modulation stages 504 writes to one of the three video cassette tapes.

Although described in the context of processing audio/video streams, high-speed digital modulator 500 may be used to convert and record any type of digital data onto magnetic tape for playback using a conventional video cassette player.

Figure 6:
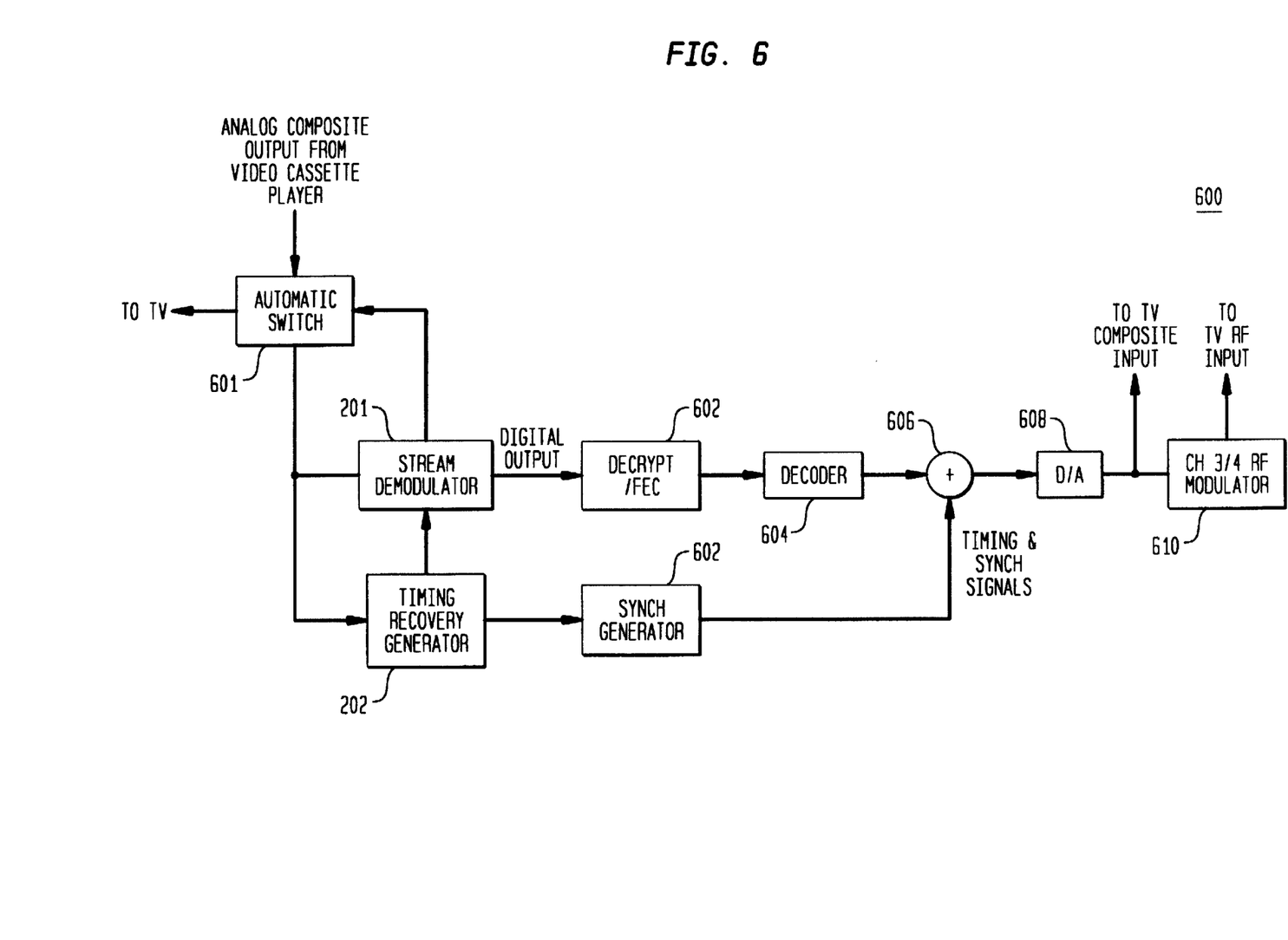
FIG. 6 is a block diagram of a video demodulator, according to one embodiment of the present invention.

Referring now to FIG. 6, there is shown a block diagram of audio/video demodulator 600, according to one embodiment of the present invention. Audio/video demodulator 600, which is based on demodulation system 200 of FIG. 2, converts analog signals for playback on a conventional television set, where the analog signals may, for example, be those generated from digital audio/video streams by either digital camcorder 400 of FIG. 4 or high-speed digital modulator 500 of FIG. 5.

In particular, audio/video demodulator 600 comprises stream demodulator 201 and timing recovery generator 202 of FIG. 2 automatic switch 601, decryption processor 602, decoder 604, synchronization generator 605, composite stream generator 606, D/A converter 608, and radio frequency (RF) modulator 610.

Automatic switch 601 receives an analog composite output signal from a conventional video cassette player (not shown). Automatic switch 601 distinguishes between conventional television (TV) signals and those generated, for example, by camcorder 400 or high-speed modulator 500. If the analog composite signal is a conventional TV signal, then automatic switch 601 directs the signal to a television set for conventional playback. If, however, the analog composite signal from the video cassette player is of the type generated by camcorder 400 or high-speed modulator 500, the automatic switch 601 directs the signal to stream demodulator 201 and timing recovery generator 202. In one implementation, stream demodulator 201 is given a chance to demodulate the analog composite signal. If it fails, then switch 601 is instructed to send the composite signal directly to the television set.

As described earlier in conjunction with FIG. 2, timing recovery generator 202 generates a system clock and stream demodulator 201 recovers the original digital stream that was input to a stream modulator, such as those of FIGS. 4 or 5. The digital stream contains audio/video data that may be both encrypted and encoded (e.g., compressed) and may also contain error correction codes. Synchronization generator 605 generates timing signals and horizontal and vertical synchronization signals based on the system clock.

Decryption/FEC processor 602 performs decryption processing to undo the encryption that was applied by encryption/FEC processor 508 of FIG. 5. Processor 602 also performs error correction processing on the digital stream. Like encryption/FEC processor 508, decryption/FEC processor 602 and its decryption and error correction processing are optional.

The resulting decrypted, error-corrected digital stream contains encoded audio/video data which is decoded by decoder 604. Decoder 604 undoes whatever audio/video compression processing (e.g., ADPCM and MPEG) was applied by an audio/video encoder, such as codec 404 of FIG. 4. Codec 404 of FIG. 4 and decoder 604 of FIG. 6 are both optional.

Composite stream generator 606 combines the resulting decoded audio/video data with the timing and synchronization signals recovered by synchronization generator 605 to generate a composite digital stream. D/A converter 608 converts the composite digital stream into a composite analog signal that is capable of being inputted to the composite input of a conventional television set (not shown) for playback of the audio/video stream. Alternatively, the composite analog signal may be modulated by RF modulator 610 (for either channel 3 or channel 4) for input to the RF input of a conventional television set for playback of the audio/video stream.

Thus, audio/video demodulator 600 can be used with a conventional video cassette player and a conventional television set to play back digital audio/video streams that have been previously recorded onto conventional video cassette tapes.

Figure 7:
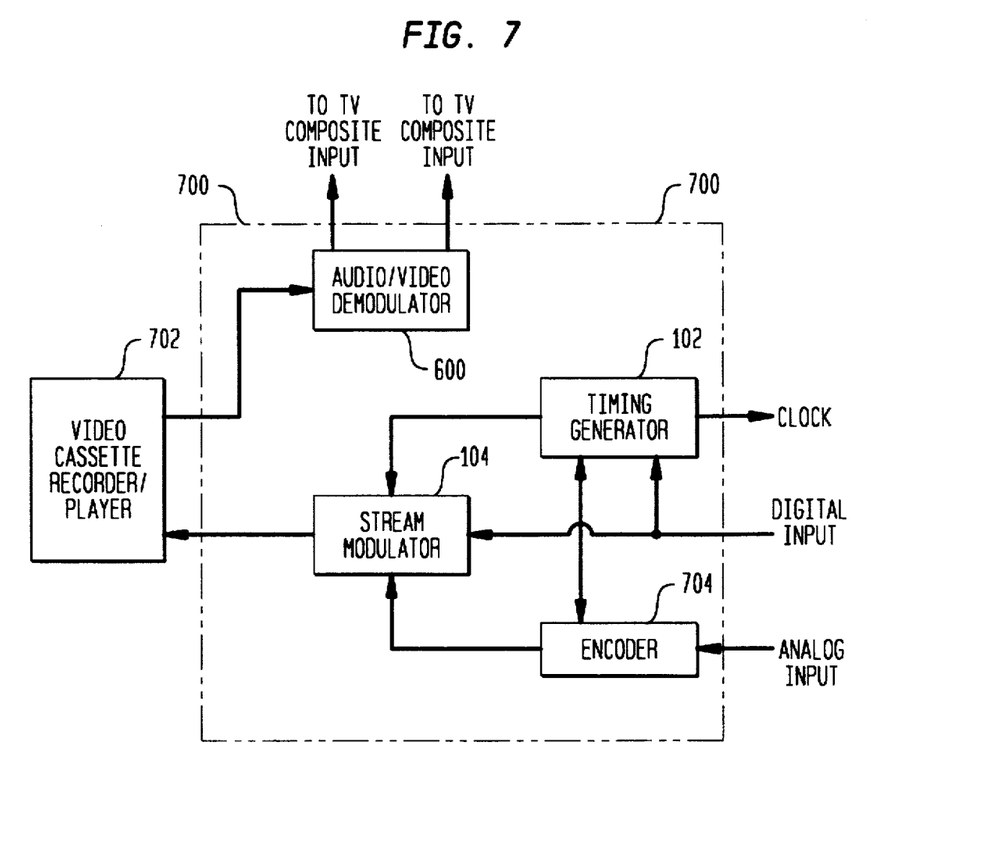
FIG. 7 is a block diagram of a video modem, according to one embodiment of the present invention.

Referring now to FIG. 7, there is shown a block diagram of audio/video modem 700, according to one embodiment of the present invention. Audio/video modem 700 is similar to modem 300 of FIG. 3, except that audio/video modem 700 is specifically designed for digital audio/video streams. Audio/video modem 700 is used in conjunction with conventional video cassette recorder/player 702 to record digital audio/video streams onto conventional video cassette tapes and to retrieve those or other digital audio/video streams from conventional video cassette tapes for playback on a conventional television set.

In particular, audio/video modem 700 comprises timing generator 102 and stream modulator 104 of FIG. 1, encoder 704, and audio/video demodulator 600 of FIG. 6. As described earlier in this specification in conjunction with FIG. 1, for audio/video modem 700, stream modulator 104 receives an encoded digital audio/video input stream and converts that digital stream into an analog output signal capable of being recorded by conventional video cassette recorder/player 702 onto a conventional video cassette tape. In an alternative mode of operation, encoder 704 receives, digitizes, and compresses analog audio and/or video input signals to generate an encoded digital audio/video input stream that may be converted by stream modulator 104 into an analog output signal for recording by video cassette recorder/player 702 onto a video cassette tape.

As described earlier in this specification in conjunction with FIG. 6, audio/video demodulator 600 receives an analog input signal retrieved by video cassette recorder/player 702 from a video cassette tape and converts the analog input signal into either an analog composite audio/video signal or an analog RF modulated audio/video signal for playback by a conventional television set. When used together with the same video cassette tape, the audio/video data generated by audio/video demodulator 600 may be the same as the original audio/video data received by stream modulator 104. In this way, audio/video modem 700 converts a conventional video cassette recorder/player into a recording device for digital audio/video data, and a conventional video cassette tape into a storage medium for digital audio/video data.

Those skilled in the art will understand that the design of audio/video modem 700 can be modified to operate with any type of data.

Alternative Embodiments

Those skilled in the art will understand that audio/video demodulator 600 of FIG. 6 and audio/video modem 700 of FIG. 7 are examples of demodulation system 200 of FIG. 2 and modem 300 of FIG. 3, respectively, that have been augmented with appropriate audio/video codecs. It will also be understood that the term "audio/video" is used to refer to signals, streams, and data that may comprise either audio or video or both.

The present invention has been described above in the context of compatibility with conventional video cassette recorder/player (VCR) technology. In one embodiment, the video cassette recorders, players, and tapes all conform to the helical scan video tape cassette system VHS standard. For further description of the VHS standard, see The Society of Motion Picture and Television Engineers, Standard 32M-1993, "½-in Type H Cassette Tape Recorders," which is incorporated herein by reference. Those skilled in the art will understand that alternative embodiments of the present invention can be compatible with technologies other than the VHS standard, including, but not limited to, VCRs conforming to the Beta standard. For further description of the Beta standard, see Yuma Shiraishi, "History of Home Videotape Recorder," SMPTE Journal, Dec. 1985, p.1257 et seq., which is incorporated herein by reference.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for converting a digital input stream into an analog output signal, comprising:

(a) a timing generator;
   (b) a modulator;
   (c) a composite stream generator; and
   (d) a digital-to-analog (D/A) converter, wherein:
      the timing generator is capable of generating timing signals comprising vertical and horizontal synchronization signals that are independent of content of the digital input stream, wherein the synchronization signals ensure that the analog output signal has temporal characteristics of a television signal;
      the modulator is capable of modulating the digital input stream to generate a modulated digital stream, wherein the modulator ensures that the analog output signal has spectral characteristics of a television signal;
      the composite stream generator is capable of generating a composite digital stream from the timing signals and the modulated digital stream; and
      the D/A converter is capable of converting the composite digital stream into the analog output signal, wherein the analog output signal has the temporal and spectral characteristics of a television signal capable of being input to a video cassette recorder for recording the analog output signal onto a video cassette tape.

2. The invention of claim 1, further comprising:

(e) a framing/signaling generator;
   (f) a forward error correction (FEC) encoder; and
   (g) a multiplexer (mux), wherein:
      the framing/signaling generator is capable of generating code signals;
      the FEC encoder is capable of adding error correction codes to the digital input stream to generate a modified digital stream; and
      the mux is capable of combining the code signals and the modified digital stream to generate the digital input stream to the modulator.

3. The invention of claim 1, further comprising:

(e) a digital generator;
   (f) a digital encoder; and
   (g) an analog recorder, wherein:
      the digital generator is capable of generating digital data;
      the digital encoder is capable of encoding the digital data to generate the digital input stream; and
      the analog recorder is capable of recording the analog output signal onto a storage medium.

4. The invention of claim 3, wherein the analog recorder is a video cassette recorder.

5. The invention of claim 4, further comprising:

(h) a framing/signaling generator;
   (i) an FEC encoder; and
   (j) a mux, wherein:
      the digital generator generates at least one of digital video data and digital audio data;
      the framing/signaling generator is capable of generating code signals;
      the FEC encoder is capable of adding error correction codes to the digital input stream to generate a modified digital stream; and
      the mux is capable of combining the code signals and the modified digital stream to generate the digital input stream to the modulator.

6. A method for converting a digital input stream into an analog output signal, comprising the steps of:

(a) generating timing signals comprising vertical and horizontal synchronization signals that are independent of content of the digital input stream, wherein the synchronization signals ensure that the analog output signal has temporal characteristics of a television signal;
   (b) modulating the digital input stream to generate a modulated digital stream, wherein the modulating ensures that the analog output signal has spectral characteristics of a television signal;
   (c) generating a composite digital stream from the timing signals and the modulated digital stream; and
   (d) D/A converting the composite digital stream into the analog output signal, wherein the analog output signal has the temporal and spectral characteristics of a television signal capable of being input to a video cassette recorder for recording the analog output signal onto a video cassette tape.

7. The invention of claim 6, wherein step (b) further comprises the steps of:

(1) generating digital data comprising at least one of digital video data and digital audio data; and
   (2) encoding the digital data to generate the digital input stream, and further comprising the step of:
      (e) recording the analog output signal onto a storage medium.

8. An apparatus for converting a digital input stream into an analog output signal, comprising:

(a) means for generating timing signals comprising vertical and horizontal synchronization signals that are independent of content of the digital input stream, wherein the synchronization signals ensure that the analog output signal has temporal characteristics of a television signal;
   (b) means for modulating the digital input stream to generate a modulated digital stream, wherein the modulating means ensures that the analog output signal has spectral characteristics of a television signal;
   (c) means for generating a composite digital stream from the timing signals and the modulated digital stream; and
   (d) means for D/A converting the composite digital stream into the analog output signal, wherein the analog output signal has the temporal and spectral characteristics of a television signal capable of being input to a video cassette recorder for recording the analog output signal onto a video cassette tape.

9. An apparatus for converting an analog input signal into a digital output stream, comprising:

(a) an analog-to-digital (A/D) converter; and (b) a demodulator, wherein:

the A/D converter is capable of converting the analog input signal into a digital stream, wherein:

the analog input signal has temporal and spectral characteristics of a television signal having been generated based on vertical and horizontal synchronization signals that are independent of content of the digital output stream; and the digital stream is a modulated digital stream; and the demodulator is capable of demodulating the modulated digital stream to generate a demodulated digital stream.

10. The invention of claim 9, further comprising an FEC decoder, wherein:

the demodulated digital stream comprises error correction codes; and the FEC decoder is capable of performing error correction processing on the demodulated digital stream based on the error correction codes to generate an error-corrected digital stream.

11. The invention of claim 9, further comprising a decryption processor, wherein:

the demodulated digital stream is encrypted; and the decryption processor is capable of decrypting the demodulated digital stream to generate a decrypted digital stream.

12. The invention of claim 9, wherein the analog input signal is received from a video cassette player.

13. The invention of claim 9, further comprising a decoder, wherein:

the demodulated digital stream comprises encoded data; and the decoder is capable of decoding the encoded data to generate a decoded stream.

14. The invention of claim 9, further comprising:

(d) a composite stream generator; and (e) a D/A converter, wherein:

the composite stream generator is capable of generating a composite digital stream from the demodulated digital stream and timing signals generated by a timing generator; and the D/A converter is capable of converting the composite digital stream into an analog output signal.

15. The invention of claim 14, wherein:

the demodulated digital stream comprises audio/video data; and the analog output signal is capable of being input to a television set for playback of the audio/video data.

16. The invention of claim 14, further comprising a radio frequency (RF) modulator, wherein:

the demodulated digital stream comprises audio/video data;

the RF modulator is capable of modulating the analog output signal to generate a modulated analog output signal; and the modulated analog output signal is capable of being input to a television set for playback of the audio/video data.

17. The invention of claim 9, further comprising:

(d) an FEC decoder;

(e) a decryption processor;

(f) a decoder;

(g) a composite stream generator; and (h) a D/A converter, wherein:

the analog input signal is received from a video cassette player;

the demodulated digital stream comprises error correction codes;

the FEC decoder is capable of performing error correction processing on the demodulated digital stream based on the error correction codes to generate an error-corrected digital stream;

the error-corrected digital stream is encrypted;

the decryption processor is capable of decrypting the error-corrected digital stream to generate a decrypted digital stream;

the decrypted digital stream comprises encoded audio/video data;

the decoder is capable of decoding the encoded audio/video data to generate a decoded audio/video stream comprising audio/video data;

the composite stream generator is capable of generating a composite digital stream from the decoded audio/video stream and timing signals generated by a timing generator;

the D/A converter is capable of converting the composite digital stream into an analog output signal; and the analog output signal is capable of being input to a television set for playback of the audio/video data.

18. A method for converting an analog input signal into a digital output stream, comprising the steps of:

(a) converting the analog input signal into a digital stream, wherein:

the analog input signal has temporal and spectral characteristics of a television signal having been generated based on vertical and horizontal synchronization signals that are independent of content of the digital output stream; and the digital stream is a modulated digital stream; and (b) demodulating the modulated digital stream to generate a demodulated digital stream.

19. The invention of claim 18, wherein the analog input signal is received from a video cassette player.

20. The invention of claim 18, further comprising the steps of:

(d) generating a composite digital stream from the demodulated digital stream and timing signals generated by a timing generator; and (e) D/A converting the composite digital stream into an analog output signal, wherein:

the demodulated digital stream comprises audio/video data; and the analog output signal is capable of being input to a television set for playback of the audio/video data.

21. An apparatus for converting an analog input signal into a digital output stream, comprising:

(a) means for converting the analog input signal into a digital stream, wherein:

the analog input signal has temporal and spectral characteristics of a television signal having been generated based on vertical and horizontal synchronization signals that are independent of content of the digital output stream; and the digital stream is a modulated digital stream; and (b) means for demodulating the modulated digital stream to generate a demodulated digital stream.

22. An apparatus for modulating and demodulating digital streams, comprising:
(a) a timing generator;
(b) a stream modulator; and
(c) a stream demodulator, wherein:
the timing generator is capable of generating timing signals comprising vertical and horizontal synchronization signals that are independent of content of a digital input stream, wherein the synchronization signals ensure that the analog output signal has temporal characteristics of a television signal;
the stream modulator is capable of generating an analog output signal from the timing signals and the digital input stream, wherein:
the stream modulator ensures that the analog output signal has spectral characteristics of a television signal;
the analog output signal has the temporal and spectral characteristics of a television signal; and
the analog output signal is capable of being input to an analog recorder for recording the analog output signal onto a storage medium; and
the stream demodulator is capable of receiving an analog input signal from an analog player and converting the analog input signal into a digital output stream, wherein the analog input signal has temporal and spectral characteristics of a television signal having been generated based on vertical and horizontal synchronization signals that are independent of content of the digital output stream.

23. The invention of claim 22, wherein the analog recorder and the analog player are part of a single video cassette recorder/player.

24. The invention of claim 22, wherein:
the analog input signal comprises audio/video signals; and
the stream demodulator is capable of converting the digital output stream into an analog audio/video output signal, wherein the analog audio/video output signal is capable of being input to a television set for playback of the audio/video signals.

25. The invention of claim 22, further comprising an encoder, wherein:
the encoder is capable of converting an optional analog input signal into an optional digital stream; and
the stream modulator is capable of optionally converting at least one of the digital input stream and the optional digital stream into the analog output signal.

26. The invention of claim 25, wherein the optional analog input signal comprises at least one of analog video images and analog audio signals.

27. The invention of claim 26, wherein:
the analog recorder and the analog player are part of a single video cassette recorder/player;
the analog input signal comprises audio/video signals; and
the stream demodulator is capable of converting the digital output stream into an analog audio/video output signal, wherein the analog audio/video output signal is capable of being input to a television set for playback of the audio/video signals.

28. A method for modulating and demodulating digital streams, comprising the steps of:
(a) generating timing signals comprising vertical and horizontal synchronization signals that are independent of content of a digital input stream, wherein the synchronization signals ensure that the analog output signal has temporal characteristics of a television signal;
(b) generating an analog output signal from the timing signals and the digital input stream, wherein:
the digital input stream is modulated to ensure that the analog output signal has spectral characteristics of a television signal;
the analog output signal has the temporal and spectral characteristics of a television signal; and
the analog output signal is capable of being input to an analog recorder for recording the analog output signal onto a storage medium;
(c) receiving an analog input signal from an analog player, wherein the analog input signal has temporal and spectral characteristics of a television signal having been generated based on vertical and horizontal synchronization signals that are independent of content of a digital output stream; and
(d) converting the analog input signal into the digital output stream.

29. The invention of claim 28, wherein the analog recorder and the analog player are part of a single video cassette recorder/player.

30. The invention of claim 28, wherein the analog input signal comprises audio/video signals and further comprising the step of converting the digital output stream into an analog audio/video output signal, wherein the analog audio/video output signal is capable of being input to a television set for playback of the audio/video signals.

31. An apparatus for modulating and demodulating digital streams, comprising:
(a) means for generating timing signals comprising vertical and horizontal synchronization signals that are independent of content of a digital input stream, wherein the synchronization signals ensure that the analog output signal has temporal characteristics of a television signal;
(b) means for generating an analog output signal from the timing signals and the digital input stream, wherein:
the digital input stream is modulated to ensure that the analog output signal has spectral characteristics of a television signal;
the analog output signal has the temporal and spectral characteristics of a television signal; and
the analog output signal is capable of being input to an analog recorder for recording the analog output signal onto a storage medium;
(c) means for receiving an analog input signal from an analog player, wherein the analog input signal has temporal and spectral characteristics of a television signal having been generated based on vertical and horizontal synchronization signals that are independent of content of a digital output stream; and
(d) means for converting the analog input signal into the digital output stream.

32. An apparatus for modulating a digital input stream, comprising:
(a) a timing generator; and
(b) two or more modulation stages, wherein each modulation stage comprises:
(1) a delay processor; and
(2) a stream modulator, wherein:
the timing generator is capable of generating timing signals comprising vertical and horizontal synchronization signals that are independent of content of the digital input stream, wherein the synchronization signals ensure that the analog output signal has temporal characteristics of a television signal; and for each modulation stage:
   the delay processor is capable of generating delay signals based on the timing signals; and
   the stream modulator is capable of converting one or more portions of the digital input stream into one or more portions of an analog output signal based on the delay signals, wherein:
      the stream modulator ensures that the analog output signal has spectral characteristics of a television signal;
      the analog output signal has the temporal and spectral characteristics of a television signal; and
      the portions of the analog output signal are capable of being recorded onto a storage medium.

33. The invention of claim 32, further comprising at least one encryption/error correction processor, wherein the encryption/error correction processor is capable of applying at least one of encryption processing and error correction processing to the digital input stream.

34. The invention of claim 32, wherein two or more of the modulation stages are capable of generating portions of the analog output signal that are capable of being recorded onto different tracks of a single magnetic tape.

35. The invention of claim 32, wherein the two or more modulation stages are capable of modulating the digital input stream for recording the analog output signal onto a video cassette tape faster than a playback speed of the video cassette tape in a video cassette player.

36. The invention of claim 35, wherein each modulation stage is capable of modulating its portions of the digital input stream faster than the playback speed.

37. The invention of claim 32, wherein the two or more modulation stages are capable of operating in parallel.

38. The invention of claim 32, wherein the portions of the analog output signal are capable of being recorded by one or more video cassette recorders onto one or more video cassette tapes.

39. The invention of claim 32, wherein the digital input stream comprises digital representations of at least one of video and audio.

40. The invention of claim 34, further comprising at least one encryption/error correction processor, wherein:
   the encryption/error correction processor is capable of applying at least one of encryption processing and error correction processing to the digital input stream;

two or more of the modulation stages are capable of operating in parallel to generate portions of the analog output signal that are capable of being recorded onto different tracks of a single video cassette tape faster than a playback speed of the video cassette tape in a video cassette player.

41. A method for modulating a digital input stream, comprising the steps of:
   (a) generating timing signals comprising vertical and horizontal synchronization signals that are independent of content of the digital input stream;
   (b) dividing the digital input stream into two or more portions;
   (c) for each portion of the digital input stream:
      (1) generating delay signals based on the timing signals; and
      (2) converting the portion of the digital input stream into a portion of an analog output signal based on the delay signals, wherein the analog output signal has temporal and spectral characteristics of a television signal and is capable of being recorded onto a storage medium.

42. The invention of claim 41, wherein the portions of the analog output signals are capable of being recorded onto different tracks of a single magnetic tape.

43. The invention of claim 41, wherein the digital input stream is converted into the analog output signal for recording onto a video cassette tape faster than a playback speed of the video cassette tape in a video cassette player.

44. An apparatus for modulating a digital input stream, comprising:
   (a) means for generating timing signals comprising vertical and horizontal synchronization signals that are independent of content of the digital input stream;
   (b) means for dividing the digital input stream into two or more portions;
   (c) for each portion of the digital input stream:
      (1) means for generating delay signals based on the timing signals; and
      (2) means for converting the portion of the digital input stream into a portion of an analog output signal based on the delay signals, wherein the analog output signal has temporal and spectral characteristics of a television signal and is capable of being recorded onto a storage medium.

* * * * *